US010567183B2

(12) United States Patent
Patil et al.

(10) Patent No.: US 10,567,183 B2
(45) Date of Patent: Feb. 18, 2020

(54) SYSTEM AND METHOD FOR CONFERENCE MESSAGING BETWEEN TELEPHONY DEVICES IN A FIRST NETWORK AND DEVICES CONNECTED TO A SECOND NETWORK

(75) Inventors: Mayuresh Madhukar Patil, Bangalore (IN); Je-Young Maeng, Suwon-si (KR); Mahfuzur Rahman, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 506 days.

(21) Appl. No.: 13/017,744

(22) Filed: Jan. 31, 2011

(65) Prior Publication Data
US 2012/0072505 A1 Mar. 22, 2012

(30) Foreign Application Priority Data

Sep. 21, 2010 (IN) ............................ 2745/CHE/2009

(51) Int. Cl.
*H04L 12/18* (2006.01)
*H04L 12/58* (2006.01)
(52) U.S. Cl.
CPC ...... *H04L 12/1822* (2013.01); *H04L 12/1836* (2013.01); *H04L 51/04* (2013.01)
(58) Field of Classification Search
CPC ... H04L 65/1006; H04L 51/04; H04L 12/581; H04L 65/1069; H04L 65/403; H04L 65/1083; H04L 12/1822; H04L 65/103; H04L 65/1093; H04L 12/2803; H04L 12/58; H04L 12/1813; H04L 12/1836; H04M 3/56
(Continued)

(56) References Cited

U.S. PATENT DOCUMENTS 5,887,136 A 3/1999 Yasuda et al.
5,889,844 A 3/1999 Kim et al.
(Continued)

FOREIGN PATENT DOCUMENTS

CN 101766004 6/2010
JP 06-268757 9/1994
(Continued)

OTHER PUBLICATIONS

Open Mobile Alliance, "Instant Messaging using SIMPLE, Candidate Version 1.0", Sep. 3, 2008, pp. 1-189.*
(Continued)

*Primary Examiner* — Linglan E Edwards
*Assistant Examiner* — Forrest L Carey
(74) *Attorney, Agent, or Firm* — The Farrell Law Firm, P.C.

(57) ABSTRACT

A system and method of conference messaging between Universal Plug and Play (UPnP) telephony devices and Wide Area Network (WAN) devices is where a conference messaging session with WAN devices is initiated by at least one Telephony Control Point (TCP) via a session request which includes session information, media capabilities of at least one TCP, a list of WAN devices, and a subject of the conference messaging session. The conference messaging session is then established between the at least one TCP and the WAN devices by a Telephony Server (TS) in an UPnP telephony based home network based on the session request.

19 Claims, 5 Drawing Sheets

(58) Field of Classification Search
USPC .................................. 370/260–269; 709/206
See application file for complete search history.

(56) References Cited

U.S. PATENT DOCUMENTS

| | | | |
|---|---|---|---|
| 5,909,543 A | 6/1999 | Tanaka et al. | |
| 6,199,164 B1 | 3/2001 | Nishimoto et al. | |
| 6,671,262 B1* | 12/2003 | Kung et al. | 370/260 |
| 2005/0213580 A1 | 9/2005 | Mayer et al. | |
| 2005/0233737 A1 | 10/2005 | Lin | |
| 2006/0174010 A1* | 8/2006 | Deshpande | 709/227 |
| 2007/0011235 A1* | 1/2007 | Mutikainen et al. | 709/204 |
| 2007/0143489 A1 | 6/2007 | Pantalone | |
| 2008/0132215 A1 | 6/2008 | Soderstrom et al. | |
| 2008/0189365 A1* | 8/2008 | Narayanaswami et al. | 709/204 |
| 2009/0204673 A1* | 8/2009 | Tian | H04L 12/1822 709/204 |
| 2010/0198954 A1* | 8/2010 | Grasso et al. | 709/223 |

FOREIGN PATENT DOCUMENTS

| | | |
|---|---|---|
| JP | 08-140171 | 5/1996 |
| JP | 08-163524 | 6/1996 |
| JP | 9-62597 | 3/1997 |
| JP | 09-186773 | 7/1997 |
| JP | 11-17675 | 1/1999 |
| JP | 2004-310272 | 11/2004 |
| JP | 2005-072877 | 3/2005 |
| JP | 2006-216043 | 8/2006 |
| JP | 2010-512062 | 4/2010 |
| KR | 1020100042635 | 4/2010 |
| WO | WO 2011/074880 | 6/2011 |

OTHER PUBLICATIONS

Chinese Office Action dated Jan. 23, 2015 issued in counterpart application No. 201180044789.5.
Korean Office Action dated Oct. 11, 2017 issued in counterpart application No. 10-2013-7010293, 12 pages.

\* cited by examiner

SYSTEM AND METHOD FOR CONFERENCE MESSAGING BETWEEN TELEPHONY DEVICES IN A FIRST NETWORK AND DEVICES CONNECTED TO A SECOND NETWORK

PRIORITY

This application claims priority under 35 U.S.C. § 119(a) to an application filed in the Indian Patent Office on Sep. 21, 2010 and assigned Serial No. 2745/CHE/2009, the entire disclosure of which is incorporated herein by reference.

BACKGROUND OF THE INVENTION

1. Field of the Invention

The present invention relates generally to a field of communication, and more particularly, to conference messaging between telephony devices in a first network and devices in a second network.

2. Description of the Related Art

UPnP is a set of computer network protocols promulgated by the UPnP Forum. The goals of UPnP forum are to allow devices to connect seamlessly and to simplify implementation of networks in home data sharing, communications, and entertainment and corporate environments. UPnP achieves this by defining and publishing UPnP device control protocols built upon open, Internet-based communication standards.

The UPnP architecture allows peer-to-peer networking of Personal Computers (PCs), networked appliances, and wireless devices. It is a distributed, open architecture, based on established standards (e.g., TCP/IP, UDP, HTTP and XML). The UPnP architecture supports zero-configuration networking. An UPnP compatible device from any vendor can dynamically join a network, obtain an IP address, transmit its name, convey its capabilities upon request, and discover presence and capabilities of other devices.

Similarly, UPnP devices can leave the network automatically without providing any unwanted state information. UPnP protocol provides discovery, control and eventing mechanisms. Discovery is enabled using Simple Service Delivery (SSD) protocol. All the control messages are in the format of Extended Markup Language (XML). Eventing follows the General Event Notification Architecture (GENA) protocol. Using these technologies, UPnP makes availability and unavailability of the UPnP devices on the fly to the other devices in the network.

The UPnP forum also provides telephony services for extending user experience in a home to access telephony services like messaging services, presence services or Call handling (PS/CS call). For example, the UPnP telephony service allows the user to access messaging services like sending a message using an UPnP device which does not have the messaging capability.

As analogous to UPnP Device Architecture (DA), telephony defines three kinds of devices, namely a Telephony Server (TS) that provides messaging, and presence related services to the user, a Telephony Control Point (TCP) to initiate actions provided by the TS and a Telephony Client device (TC) for media related handling and providing input and output of the UPnP device.

Current UPnP telephony messaging service allows the user to send different types of messages (SMS/MMS/Chat IM/Email). The messaging service supports page mode messaging (e.g., SMS, MMS, email, and the like) and session mode messaging (e.g., chatting). The messaging service also allows the user to group a number of messages into a single messaging session whereby the message service defines actions to create the session and group the messages into a single messaging session. The UPnP telephony messaging service also allows a user to modify the existing session.

However, the user of the UPnP device cannot use the messaging service for conference messaging with WAN devices, and joining/rejoining the conference messaging session due to different TCP/TC devices in the UPnP telephony based home network that may not support all media content types. For example, a television set can display plain text but may not support pictures. Further, if pictures need to be retrieved, then content negotiation has to be carried out before a conference messaging session is set up. Also, the WAN devices are unaware of the media capabilities of the TCP/TC device.

If media capabilities, such as supported Multipurpose Internet Mail Extensions (MIME) types, are not taken into account, then it is possible that the UPnP telephony device or the TCP may receive unsupported media content from the WAN devices, not at all supported by the TCP, in the conference messaging session, resulting in inconsistent user experience with respect to the conference messaging session. Currently the UPnP telephony messaging service fails to capture and provide dynamic session information (e.g., user leaving or joining the session) associated with the conference messaging session as dynamic information is required to push to the user rather than pull from the TCP.

SUMMARY OF THE INVENTION

Accordingly, the present invention has been made to solve the above-mentioned problems occurring in the prior art, and the present invention provides a system and method of conference messaging between UPnP telephony devices and WAN devices.

According to one aspect of the present invention, a method includes initiating a conference messaging session with WAN devices by at least one TCP via a session request. The session request includes session information, media capabilities of the at least one TCP, a list of WAN devices, and a subject of the conference messaging session. The method further includes establishing the conference messaging session between the at least one TCP and the WAN devices by a Telephony Server (TS) in an UPnP telephony based home network based on the session request.

According to another aspect of the present invention, an UPnP telephony based home network system includes at least one TCP for initiating a conference messaging session with WAN devices via a session request, where the session request includes session information, media capabilities of the at least one TCP, a list of WAN devices and a session subject. The system also includes a TS connected to the TCP for establishing the conference messaging session between the at least one TCP and the WAN devices based on the session request. The UPnP also includes a TC device connected to the TS for media related handling and providing input and output of the TCP during the conference messaging session.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
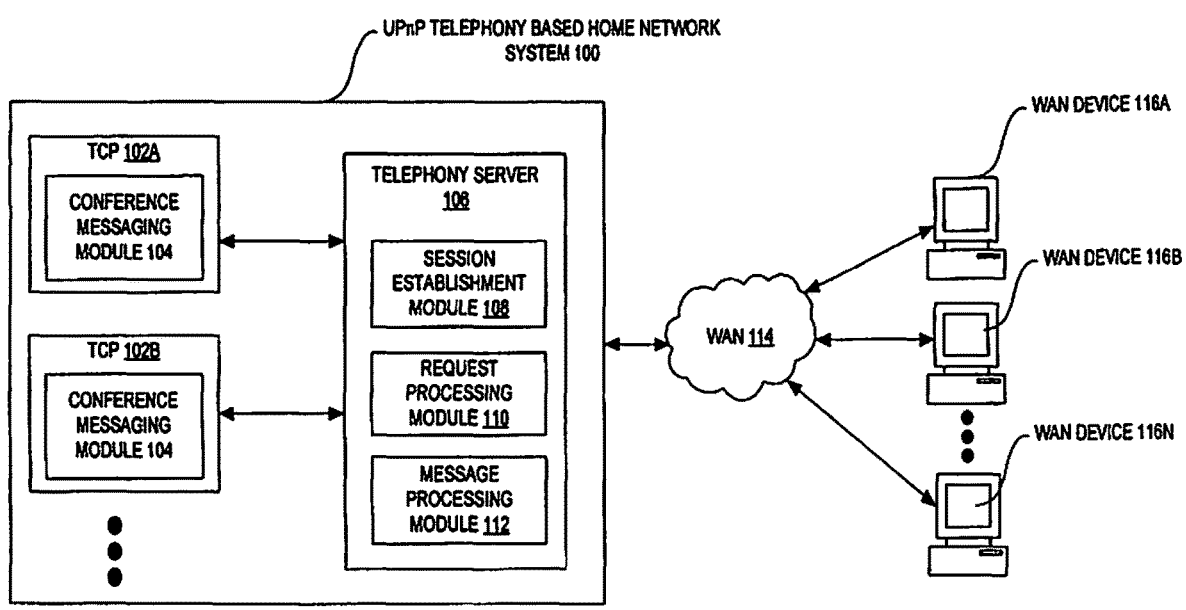
FIG. 1 is a block diagram of a UPnP telephony based home network system enabling conference messaging between one or more TCPs and WAN devices, according to one embodiment of the present invention.

The present invention provides a system and method of conference messaging between UPnP enabled telephony devices and WAN devices. Embodiments of the present invention will be described with reference to the accompanying drawings. In the following description, various specific definitions are provided only to help general understanding of the present invention, and it is apparent to those skilled in the art that the present invention can be implemented without such definitions. Further, in the following description of the present invention, a detailed description of known functions and configurations incorporated herein will be omitted to avoid obscuring the subject matter of the present invention. Throughout the drawings, corresponding reference numerals indicate like or corresponding parts and features.

FIG. 1 is a block diagram of an UPnP telephony based home network system 100 enabling conference messaging between one or more telephony control points (TCPs) 102A-N and WAN devices 116A-N, according to one embodiment. In FIG. 1, the UPnP telephony based home network system 100 includes the TCPs 102A-N communicatively connected to a telephony server (TS) 106. The TS 106 is connected to the WAN devices 116A-N via the WAN 114.

Each of the TCPs 102A-N includes a conference messaging module 104 for initiating, modifying, transferring and joining a conference messaging session associated with the WAN devices 116A-N. The conference messaging session is initiated via a session request that includes list of WAN devices, media capabilities (e.g., MIME types), session subject, and session type. The TS 106 includes a request processing module 110 for processing a session request (e.g., initiate session request, modify session request, join session request and transfer session request) received from the one or more TCPs 102A-N. The TS 106 also includes a session establishment module 108 for establishing a conference messaging session between the one or more TCPs 102A-N and the one or more WAN devices 116A-N based on the session request.

The TS 106 further includes a message processing module 112 for enabling conference messaging between one of the TCPs 102A-N and the WAN devices 116A-N based on media capabilities of said one of the TCPs 102A-N. The message processing module 112 may also allow the TCPs 102A-N to subscribe to the dynamic session information associated with an ongoing conference messaging session using General Event Notification Architecture (GENA) protocol.

For example, the dynamic session information may include user leaving the session information, user joining the session information, any changes made to the subject of the conference messaging session and the like. If any of TCPs 102A-N subscribes, the TS 106 provides dynamic session information associated with the ongoing conference messaging session as notifications to the corresponding TCPs 102A-N. A structure of the dynamic session information in an XML format is given in Table 1. Moreover, the operation of the UPnP telephony based home network system 100 is described in greater detail in FIGS. 2-5.

TABLE 1

```
<?xml version="1.0" encoding="UTF-8"?>
    <messaging:Dynamicinfo xsi:schemaLocation="urn:schemas-upnp-org:phone:messaging messaging-
v1-WD-20090826.xsd"                            xmlns:xsi="http://www.w3.org/2001/XMLSchema-instance"
xmlns:messaging="urn:schemas-upnp-org:phone:messaging">
            <messaging:IMSessionID>abcdef</messaging:IMSessionID>
            <messaging:MessageClass>Conference Session</messaging:MessageClass>
            <messaging:subject>TELEPHONY DISCUSSION</messaging:subject>
            <messaging:RecipientsList>
                <messaging:Recipient>
    <messaging:RecipientAdd>john.doe@acme.com<messaging:Recipient></messageing:RecipientAdd>
            <messaging:status>Disconnected</messaging:status>
            <messaging:displayName>Cool-Dude</messaging:DisplayName>
            <messaging:displayimage>URI</messaging:displayimage>
                </messaging:Recipient>
        </messaging:RecipientAddress>
</messaging:Dynamicinfo>
```

Figure 2:
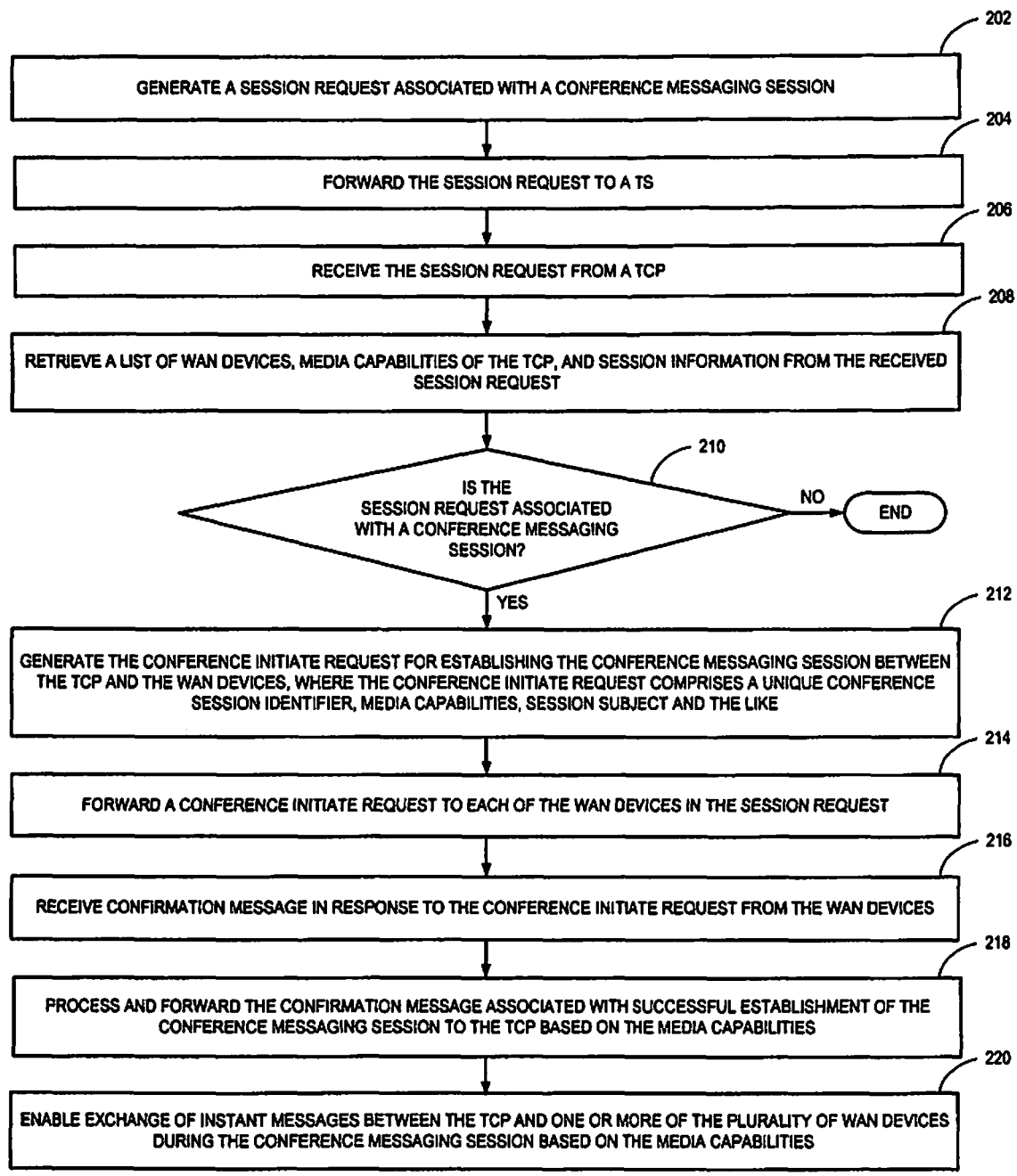
FIG. 2 is a flow chart illustrating a process of conference messaging between the TCP in the UPnP telephony based home network system and the WAN devices, according to one embodiment of the present invention.

FIG. 2 is a process flow diagram illustrating a method of conference messaging between the TCP 102A in the UPnP telephony based home network system 100 and the WAN devices 116A-N, according to one embodiment. At Step 202, a session request for initiating a conference messaging session is generated. At Step 204, the session request is forwarded to the TS 106 by the TCP 102A. At Step 206, the session request is received by the TS 106 from the TCP 102A. At Step 208, the received session request is processed and a list of WAN devices, media capabilities of the TCP 102A, and session information (e.g., subject) is retrieved from the received session request by the TS 106.

At Step 210, it is determined whether the session request is associated with a conference messaging session based on the session information. On one hand, if the session identifier is "individual", then it is determined that the session request is not associated with the conference messaging session and the process is terminated. On the other hand, if the session identifier embedded in the session request is "Group" then it is determined that the session request is associated with the conference messaging session. In such case, the conference initiate request is generated by the TS 106 for establishing the conference messaging session between the TCP 102A and the WAN devices 116A-N at Step 212. For example, the conference initiate request may include a unique conference session identifier, the media capabilities of the TCP 102A, the session subject and the like.

At Step 214, the conference initiate request is forwarded by the TS 106 to each of the WAN devices 116A-N requested in the session request. At Step 216, a confirmation message is received from each of the WAN devices 116A-N in response to the conference initiate request. At Step 218, the confirmation message associated with successful establishment of the conference messaging session is processed and forwarded by the TS 106 to the TCP 102A based on its media capabilities.

At Step 220, exchange of one or more instant messages is enabled between the TCP 102A and one or more of the WAN devices 116A-N based on the media capabilities during the conference messaging session. For example, the one or more instant messages may be exchanged using OMA SIMPLE IM messaging service. The process illustrated in FIG. 2 may also allow the TCP 102A to modify, update or transfer the ongoing conference messaging session with the WAN devices 116A-N as described in greater detail in FIGS. 3 and 4. Further, the above-described process of FIG. 2 may provide dynamic information during an ongoing conference messaging session.

Figure 3:
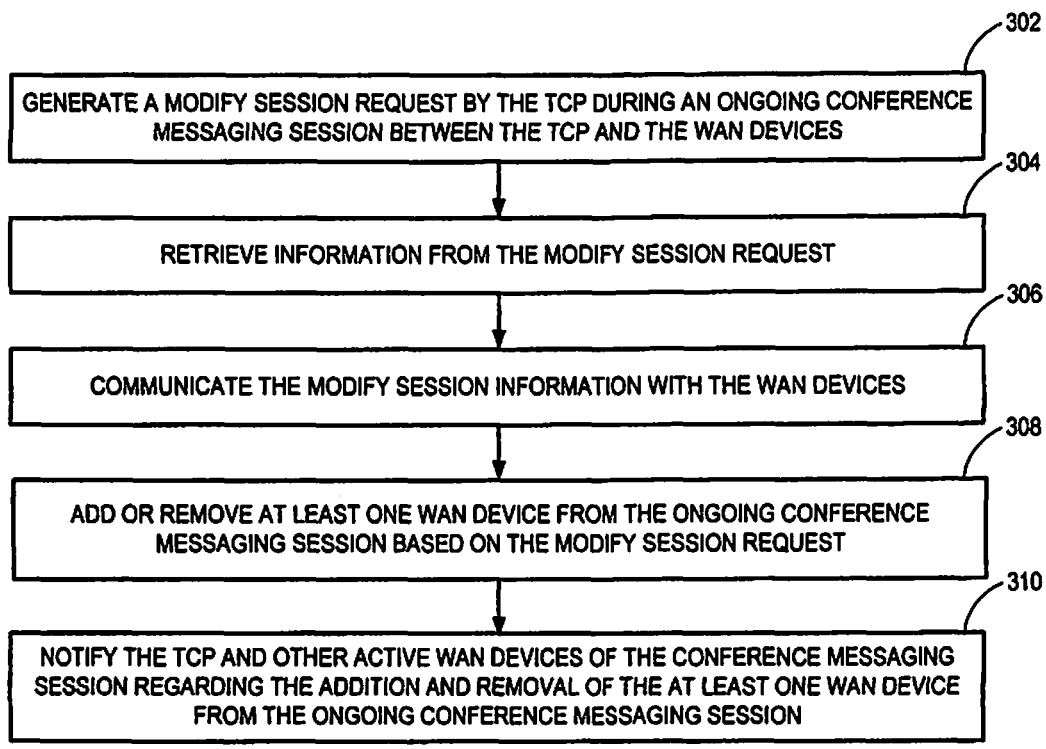
FIG. 3 is a flow chart illustrating a process of adding or removing at least one WAN device by the TCP into/from an ongoing conference messaging session, according to one embodiment of the present invention.

FIG. 3 is a process flow diagram illustrating a method of adding or removing at least one WAN device by the TCP 102A into/from an ongoing conference messaging session, according to one embodiment. At Step 302, a modify session request is generated by the TCP 102A during an ongoing conference messaging session between the TCP 102A and the WAN devices 116A-N. The modify session request includes subject information, media capabilities of the TCP 102A, at least one WAN device to be added/removed into/from the conference messaging session.

At Step 304, information is retrieved by the TS 106 from the received modify session request. At Step 306, the modify session information is communicated with the WAN devices 116A-N by the TS 102 over the WAN 114. At Step 308, at least one WAN device is added or removed to/from the ongoing conference messaging session based on the modify session request. At Step 310, the TCP 102A and other active WAN devices of the ongoing conference messaging session are notified regarding the addition and removal of the at least one WAN device from the ongoing conference messaging session. It can be noted that, Steps 304 through 310 are performed by the TS 106. In the same manner, the TCP can update the information (e.g., status, subject, conference schedule information, and the like) during the ongoing conference messaging session.

Figure 4:
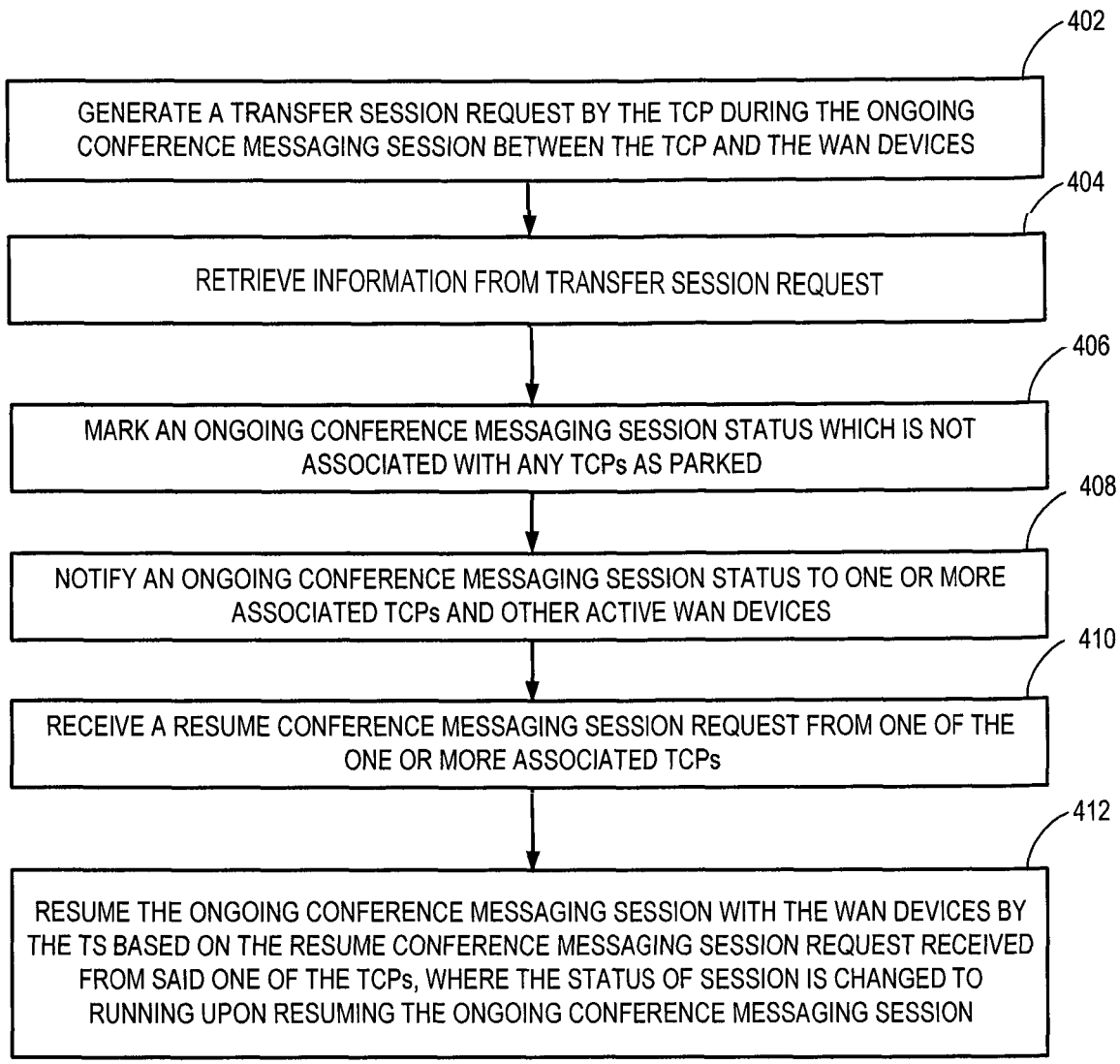
FIG. 4 is a flow chart illustrating a process of transferring an ongoing conference messaging session from the TCP to another TCP, according to one embodiment of the present invention.

FIG. 4 is a process flow diagram illustrating a method of transferring an ongoing conference messaging session from the TCP 102A to another TCP 102B, according to one embodiment. At Step 402, a transfer session request is generated by the TCP 102A during the ongoing conference messaging session between the TCP 102A and the WAN devices 116A-N. The transfer session request is meant for leaving the ongoing session without termination. At Step 404, session identifier information is retrieved from the transfer session request received from the TCP 102A by the TS 106. At Step 406, an ongoing conference messaging session status which is not associated with any TCPs is marked as parked. The term "session parking" refers to temporarily storing the information associated with the ongoing conference messaging session into the TS 106.

In Step 408, the ongoing conference messaging session status is notified to one or more associated TCPs 102B-N and the WAN devices 116A-N connected to the TS 106. At Step 410, a resume conference messaging session request is received from one of the associated one or more TCPS 102B-N. At Step 412, the ongoing conference messaging session with the WAN devices 116A-N is resumed by the TS 106 based on the resume conference messaging session request received from said one of the TCPs 102B-N and the status of session is changed to running.

In one embodiment, upon receiving the transfer session request, the TS 106 provides an access identifier associated with the ongoing conference messaging session to the TCP 102A. Accordingly, the TS 106 receives the resume ongoing conference messaging session request with the access identifier from a different one of the TCPs 102B-N. Based on the access identifier, the TS 106 resumes the ongoing conference messaging session on the different one of the TCPs 102B-N. In an alternate embodiment, if the access identifier is not generated, then upon forwarding the resume ongoing conference messaging session request, the TS 106 sends a response along with the session information such as information of parked sessions, associated session identifiers and other related information in an XML format to one of the TCPs 102B-N. Then, the one of the TCP 102B-N sends a resume ongoing conference messaging session request along with the associated session identifier to the TS 106. Accordingly, the TS 106 resumes the ongoing conference messaging session on the different one of the TCPs 102B-N.

Accordingly, the ongoing conference messaging session is transferred seamlessly between the TCP 102A and one of the TCPs 102B-N. Although, the above steps describe transferring the session from one TCP to another TCP, one skilled in the art can understand that the ongoing conference messaging session can be transferred from a TCP to a telephony client device (TC). The TC is connected to the TS 106 for media related handling and providing input and output of the TCP during the conference messaging session.

In another aspect of the present invention, the TCP 102A fetches media capabilities of the TC and then sets up the input-output session between the TC and the TS 106. This is performed using the input configuration service of the UPnP telephony based home network system. In these embodiments, the TCP 102A fetches device capabilities of the TC and the TS 106, and then decide on device roles as per user request, and sets up the input and output channel. Accordingly, the TC can send instant messages to the one or more WAN devices during the ongoing conference messaging session. It can be noted that, the instant messages are exchanged between the TC and TS 106 and the TCP 102A acts as a session control point.

In transferring a session, consider the example where John Doe is using an UPnP telephony based home network system having a personal computer, and TV acting as TCP for accessing messaging service and a cell phone acting as TS to interface with WAN devices. Further, consider that John Doe initiates a conference messaging session with his friends using WAN devices. During the conference messaging session, John Doe comes to know from one of his friends about news flashing on a TV channel and wishes to watch the news. In this scenario, John Doe wishes to transfer the ongoing conference messaging session from the PC to the TV so as to chat simultaneously while watching the news on the TV. The TV may act as a TC connected to the TCP (i.e., PC) or a TCP. This is achieved by transferring the session as described in above process flow of transferring a conference messaging session.

In another aspect of the present invention, in transferring a session, consider that John Doe is using an UPnP telephony based home network system having a personal computer, and TV acting as TCP for accessing messaging service and a cell phone acting as TS to interface with WAN devices. Further, consider that John Doe initiates a conference messaging session with his friends using WAN devices. During the conference messaging session, John Doe comes to know from one of his friends about news flashing on a TV channel and wishes to watch the news. In this scenario, John Doe wishes to transfer the ongoing conference messaging session from the PC to the TV so as to chat simultaneously while watching the news on the TV. The TV may act as a TC connected to the TCP (i.e., PC) or a TCP. This is achieved by transferring the session as described in above process flow of transferring a conference messaging session.

Figure 5:
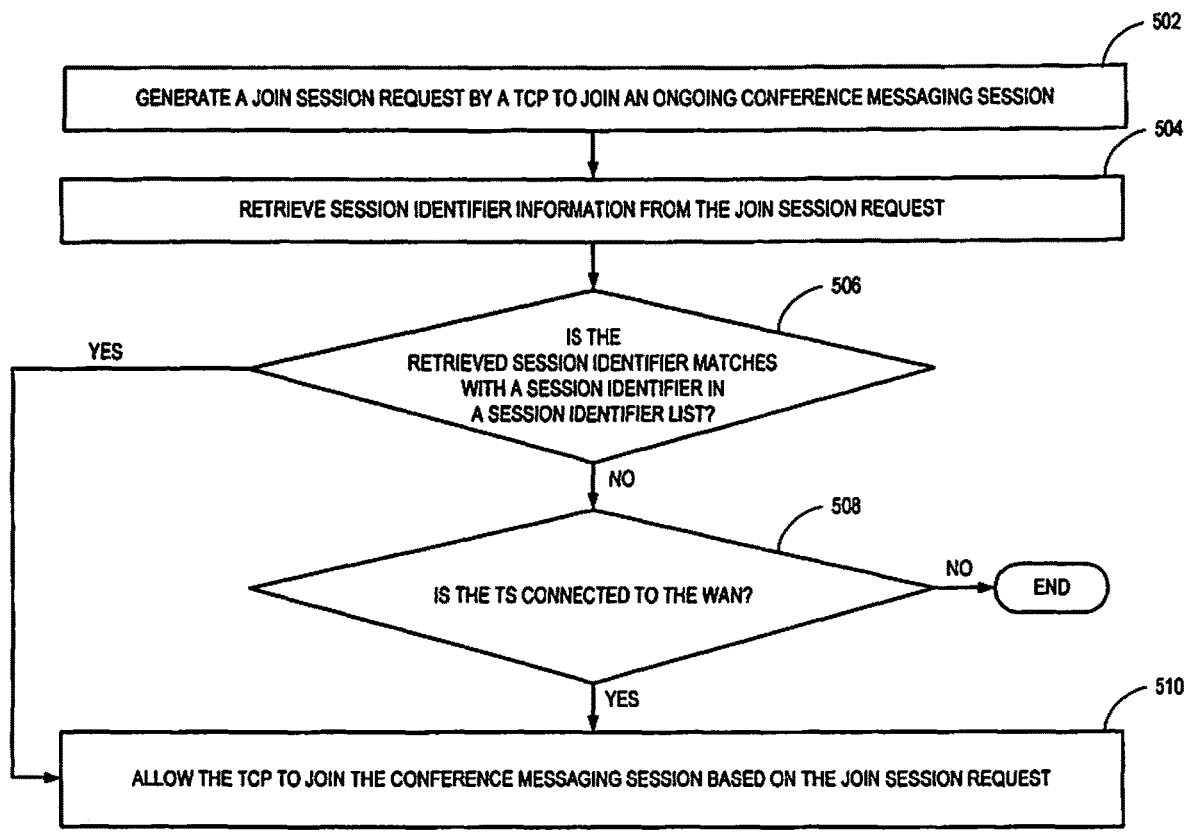
FIG. 5 is a flow chart illustrating a process of joining an ongoing conference messaging session with the WAN devices, according to one embodiment of the present invention.

FIG. 5 is a process flow diagram illustrating a method of joining an ongoing conference messaging session with the WAN devices 116A-N, according to one embodiment. At Step 502, a join session request is generated by the TCP 102A to join an ongoing conference messaging session. For example, the TCP 102A may generate the join session request if the battery of mobile phone is running low or loss of signal to the TS 106. At Step 504, a session identifier is retrieved from the received join session request by the TS 106.

In Step 506, it is determined whether the retrieved session identifier matches with a session identifier in the session identifier list. If the determination is true, then the TCP 102A is allowed to join the ongoing conference messaging session at Step 510. If the determination is false, then at Step 508 it is determined whether the TS 106 is connected to the WAN 114. If the TS 106 is connected to the WAN 114, then the TCP 102A is allowed to join the ongoing conference messaging session, at Step 510, otherwise the process is terminated.

Moreover, in one embodiment, a non-transitory computer-readable storage medium has instructions that, when executed by one of the TCPs 102A-N (e.g., Television, Personal Computer) and/or TS 102 (e.g., mobile phone, PDA, and the like), causes the one of the TCPs 102A-N and the TS 106 perform the methods of FIGS. 2-5.

It will be understood by those skilled in the art that the various embodiments discussed herein may or may not be the same embodiment, and may be grouped into various other embodiments not explicitly disclosed herein. In addition, it will be appreciated by those skilled in the art that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense and various changes in form and detail may be made therein without departing from the spirit and scope of the invention as defined by the appended claims.

What is claimed is:

1. A method for performing, by a Telephony Server (TS) in a first network, conference messaging between at least one Telephony Control Point (TCP) in the first network and a plurality of Wide Area Network (WAN) devices connected to a second network, comprising:
    receiving a session request associated with a conference messaging session with the plurality of WAN devices from at least one TCP in the first network, wherein the session request includes session information, media capabilities of the at least one TCP, a list of the plurality of WAN devices, and a subject of the conference messaging session;
    establishing the conference messaging session between the at least one TCP and the plurality of WAN devices based on the session request,
    wherein establishing the conference messaging session comprises:
    generating a conference initiation request associated with the conference messaging session, wherein the conference initiation request includes a session identifier, the media capabilities of the at least one TCP, and the subject of the conference messaging session, and
    transmitting the conference initiate request to each of the plurality of WAN devices connected to the second network listed in the session request,
    receiving a modify session request from the at least one TCP in the conference messaging session while the conference messaging session is ongoing, wherein the modify session request includes the subject of the conference messaging session, the media capabilities of the at least one TCP, and list information of at least one WAN device connected to the second network to be added into or removed from the conference messaging session; and
    modifying the ongoing conference messaging session by adding or removing the at least one WAN device according to the list information of at least one WAN device,
    wherein the method further comprises:
    receiving a leave session request from the at least one TCP in the conference messaging session while the conference messaging session is ongoing;
    retrieving the session identifier from the leave session request, wherein the leave session request is used to identify whether to leave the ongoing conference messaging session without termination;
    marking an ongoing conference messaging session status as parked; and
    notifying associated one or more TCPs and the plurality of WAN devices of the status of the ongoing conference messaging session, each of the associated one or more TCPs being presently or previously on the ongoing conference messaging session,
    wherein, while the conference messaging session is ongoing, a dynamic session information associated with the conference messaging session is provided to the at least one TCP, wherein the dynamic session information includes user leaving session information, user joining session information, or any changes in the subject of the conference messaging session, and
    wherein the first network is a Universal Plug and Play (UPnP) telephony based home network, and the second network is a WAN.

2. The method of claim 1, wherein establishing the conference messaging session between the at least one TCP and the plurality of WAN devices comprises:
    initiating the conference messaging session with the plurality of WAN devices based on the session request; and enabling the conference messaging between the at least one TCP and one or more WAN devices from among the plurality of WAN devices based on the media capabilities of the at least one TCP.

3. The method of claim 2, wherein establishing the conference messaging session between the at least one TCP and the plurality of WAN devices based on the session request further comprises:
retrieving the list of the plurality of WAN devices, the media capabilities of the at least one TCP, and the session information from the session request;
determining whether the session request is associated with the conference messaging session based on the session information; and
if the session request is associated with the conference messaging session, forwarding the conference initiation request to each of the plurality of WAN devices.

4. The method of claim 3, wherein forwarding the conference initiation request to each of the plurality of WAN devices comprises:
generating the conference initiation request for establishing the conference messaging session between the at least one TCP and the plurality of WAN devices, wherein the conference initiation request includes the session identifier, media capabilities, and a session subject; and
sending the conference initiation request to each of the plurality of WAN devices.

5. The method of claim 4, wherein establishing the conference messaging session between the at least one TCP and the plurality of WAN devices based on the session request further comprises:
receiving one or more confirmation messages from the one or more WAN devices in response to the conference initiation request, each of the one or more confirmation messages indicating successful initiation of the conference messaging session; and
processing and forwarding the one or more confirmation messages to the at least one TCP.

6. The method of claim 2, wherein enabling the conference messaging between the at least one TCP and the one or more WAN devices from among the plurality of WAN devices comprises:
enabling exchange of a plurality of instant messages between the at least one TCP and the one or more WAN devices during the conference messaging session based on the media capabilities of the at least one TCP.

7. The method of claim 2, wherein enabling the conference messaging between the at least one TCP and the one or more WAN devices further comprises:
receiving one or more instant messages from the one or more WAN devices during the conference messaging session;
processing the one or more instant messages such that the one or more instant messages are displayed in a compatible format on a display of the at least one TCP based on the media capabilities of the at least one TCP; and
forwarding the processed one or more instant messages to the at least one TCP.

8. The method of claim 1, wherein modifying the ongoing conference messaging session further comprises:
retrieving information from the modify session request, wherein the modify session request further includes the session identifier;
transmitting the information retrieved from the modify session request to the plurality of WAN devices;
and
notifying one or more associated TCPs and other active WAN devices connected to the second network of the conference messaging session regarding the addition and removal of the at least one WAN device, each of the associated one or more TCPs being presently or previously in the ongoing conference messaging session.

9. The method of claim 1, further comprising:
receiving a resume session request from the at least one TCP; and
resuming the ongoing conference messaging session with the plurality of WAN devices based on the resume session request received from the at least one TCP, wherein the status of session is changed to running upon resuming the ongoing conference messaging session.

10. The method of claim 1, further comprising:
receiving a join session request from the at least one TCP;
retrieving the session identifier from the join session request;
determining whether the retrieved session identifier matches a session identifier in a session identifier list; and
if the retrieved session identifier matches the session identifier of the session identifier list, allowing the at least one TCP to join the conference messaging session based on the join session request.

11. The method of claim 1, further comprising:
receiving information associated with the conference messaging session from at least one of the plurality of WAN devices or the at least one TCP in the conference messaging session while the conference messaging session is ongoing;
updating information associated with the conference messaging session while the conference messaging session is ongoing.

12. A Telephony Server (TS), in a first network, for performing conference messaging between at least one Telephony Control Point (TCP) in the first network and a plurality of Wide Area Network (WAN) devices connected to a second network, comprising:
a transceiver configured to receive, from at least one TCP in the first network, a session request associated with a conference messaging session with the plurality of WAN devices, wherein the session request includes session information, media capabilities of the at least one TCP, a list of the plurality of WAN devices, and a subject of the conference messaging session; and
a processor configured to establish the conference messaging session between the at least one TCP and the plurality of WAN devices based on the session request, generate a conference initiation request associated with the conference messaging session, wherein the conference initiation request includes a session identifier, the media capabilities of the at least one TCP, and the subject of the conference messaging session, and transmit the conference initiation request to each of the plurality of WAN devices connected to the second network listed in the session request,
wherein the processor is further configured to:
receive a modify session request from the at least one TCP in the conference messaging session while the conference messaging session is ongoing, wherein the modify session request includes the subject of the conference messaging session, the media capabilities of the at least one TCP, and list information of at least one WAN device connected to the second network to be added into or removed from the conference messaging session, modify the ongoing conference messaging session by adding or removing the at least one WAN device according to the list information of at least one WAN device, receive a leave session request from the at least one TCP in the conference messaging session while the conference messaging session is ongoing, retrieve the session identifier from the leave session request, wherein the leave session request is used to identify whether to leave the ongoing conference messaging session without termination, mark an ongoing conference messaging session status as parked, and notify associated one or more TCPs and the plurality of WAN devices of the status of the ongoing conference messaging session, each of the associated one or more TCPs being presently or previously on the ongoing conference messaging session, wherein, while the conference messaging session is ongoing, a dynamic session information associated with the conference messaging session is provided to the at least one TCP, wherein the dynamic session information includes user leaving session information, user joining session information, or any changes in the subject of conference session, and wherein the first network is a Universal Plug and Play (UPnP) telephony based home network, and the second network is a WAN.

13. The TS of claim 12, wherein the processor is further configured to:

establish the conference messaging session by initiating the conference messaging session with the plurality of WAN devices based on the session request, and enable conference messaging between the at least one TCP and one or more of the plurality of WAN devices based on the media capabilities of the at least one TCP.

14. The TS of claim 13, wherein the processor is further configured to:

initiate the conference messaging session with the plurality of WAN devices by retrieving the list of the plurality of WAN devices, the media capabilities of the at least one TCP, and the session information from the session request, determine whether the session request is associated with the conference messaging session based on the session information, and forward the conference initiation request to each of the plurality of WAN devices in the session request based on the determination.

15. The TS of claim 14, wherein the processor is further configured to:

generate the conference initiation request for establishing the conference messaging session between the at least one TCP and the plurality of WAN devices, and send the conference initiation request to each of the plurality of WAN devices in the session request, wherein the conference initiation request includes the session identifier, media capabilities of the at least one TCP, and a session subject.

16. The TS of claim 15, wherein the processor is further configured to:

process one or more instant messages from one or more of the plurality of WAN devices based on the media capabilities of the at least one TCP such that the one or more instant messages are displayed in a compatible format on a display of the at least one TCP, and forward the processed one or more instant messages to the at least one TCP.

17. The TS of claim 12, wherein the processor is further configured to:

modify the conference messaging session while the conference messaging session is ongoing upon receiving the modify session request from the at least one TCP.

18. The TS of claim 12, wherein the processor is further configured to:

modify the conference messaging session while the conference messaging session is ongoing, by transferring the ongoing conference messaging session from a TCP presently in the conference messaging session to another TCP upon receiving a transfer session request.

19. The TS of claim 12, wherein the processor is further configured to:

modify the conference messaging session while the conference messaging session is ongoing, by joining the at least one TCP to the ongoing conference messaging session with the plurality of WAN devices upon receiving a join session request.

* * * * *